Patented Nov. 8, 1949

2,487,540

UNITED STATES PATENT OFFICE

2,487,540

MONOAZO CHROMIUM COMPLEX

Harry W. Grimmel, Providence, R. I., and Ludwig Richter, Easton, Pa., assignors to General Aniline & Film Corporation, New York, N. Y., a corporation of Delaware No Drawing. Application August 14, 1948, Serial No. 44,408

1 Claim. (Cl. 260—151)

This invention relates to the production of azo dye compounds and their application to the art of dyeing or coloring. More particularly, it relates to a monoazo dye capable of being converted into its metal complex compounds by the monochrome or metachrome process as well as the after-chrome process.

In the dyeing of woolen fabrics by one or another of the mordanting processes, such as chrome mordanting, top-chrome, after-chroming and monochrome or metachrome processes, which are commonly employed in the fixing of acid dyes onto the fabrics, it is highly desirable that the dyes be such that they do not stain acetate effects in the fibers. Many dyes, particularly azo dyes, have been developed which are suitable for the after-chroming process and some have been produced which are suitable for the monochrome or metachrome mordanting process. However, few give good results in both processes. In the monochrome or metachrome process, the azo dye is metallized and precipitated on the fiber simultaneously by adding to the dye bath a mixture of an alkali metal chromate and an ammonium salt, such as ammonium sulfate. When the dye liquor is boiled, ammonia is gradually evolved and sulfuric acid formed in the dye bath which at once converts the chromate present into the bichromate. This acts on the dyestuff and fixes it on the fiber as the chrome lake. When the chromate mixture is added to the dye bath, no precipitation takes place so that it is possible to dye in one bath. However, if the bichromate is added to the dye bath along with the dyestuff, immediate precipitation of the dyestuff generally takes place. Many dyestuffs are precipitated even by the chromate so that this process is necessarily limited in its application.

Among those dyes which are said to be suitable for the monochrome or metachrome process is the monoazo dye obtained from diazotized 4-nitro-2-aminophenol coupled with N-phthaloylamido hydroxynaphthalene. This dye is described in U. S. Patent 1,411,245 and it is said that, when this dye is dyed in the presence of an alkali metal chromate and an ammonium salt, such as ammonium sulfate, it will furnish on wool olive tints of an excellent fastness to milling. It has been discovered, however, that the olive tints produced by this dye are of an unattractive dull shade which has a poor evening color, that is, when viewed under artificial light it has a different shade than when viewed under natural light. When dyeing wool fabrics having acetate effects, it has further been discovered that this dye stains the acetate effect fibers a very heavy violet color and also that when dyed by the after-chroming process rather than the monochrome process described in the patent, it yields only very weak shades of a greenish-gray color, apparently due to the fact that the dye is not stable to the oxidizing influence of the bichromate used in the after-chroming bath.

In our co-pending application Serial Number 628,658, filed November 14, 1945, now Patent No. 2,459,813, there is described a monoazo dye produced from diazotized 4-nitro-2-aminophenol-6-sulfonic acid and the N-phthaloylamido hydroxynaphthalene coupling component of the following structure:

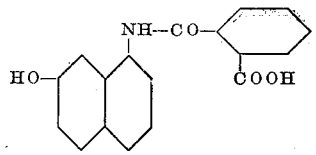

which, when converted in substance or on the fiber by any of the common metallizing processes into its metal complex compounds, produces dyeings of outstanding properties. We have also found that the monoazo dye produced from the isomeric 6-nitro-2-aminophenol-4-sulfonic acid and the same N-phthaloylamido hydroxynaphthalene coupling component has similarly distinctive properties. The isomeric dye produces a green-gray shade when applied to wool by the monochrome process, that is, by fixing the un-metallized dye on the fabric in the presence of an alkali metal chromate and an ammonium salt such as ammonium sulfate. When treated by the after-chrome process the 6-nitro-2-aminophenol-4-sulfonic acid azo dye produces a very deep olive-black shade. In both cases the shade produced is more neutral and is influenced more by the blue than the yellow than in the case of the monochrome and after-chrome effects produced from the 4-nitro-2-aminophenol-6-sulfonic acid isomer when using the same N-phthaloylamido hydroxynaphthalene coupling component.

Our new azo dye derived from the diazotized 6-nitro-2-aminophenol-4-sulfonic acid in its chrome complex form has excellent evening shade, that is, does not change color when viewed in artificial light. It is extremely fast to light, crocking and fulling. It dyes level shades and does not stain acetate effects in wool.

In order to illustrate how the new dye of this invention may be manufactured without, however, limiting the invention to this particular

Example 33.9 grams 6-nitro-2-aminophenol-4-sulfonic acid 100% is diazotized in the usual way at 0° C. and combined with a solution of 45.8 grams 1-phthaloylamido-7-hydroxynaphthalene 100% M. W. 307 in 200 ml. water, 15 ml. NaOH solution (40% by weight) and 150 cc. of a 20% soda ash solution.

Ice is added to keep the combination temperature at 15° C. Test for diazo reaction disappears within one-half hour. By salting out and acidifying to violet reaction on Congo paper, the dye is precipitated. After filtration, the filter cake is pasted with sufficient soda ash to obtain alkaline reaction. The dye is then dried by known methods. It has the structural formula:

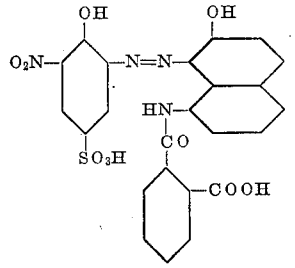

The dye which is thus obtained dissolves easily in water and yields when dyed on wool by the direct method a black dye which by after-chroming turns to a powerful olive-black. When the dye is dyed on wool according to the monochrome process of metachrome mordant process, a bright green shade having excellent fastness to light, crocking and fulling is obtained, which shade does not change to any appreciable extent when viewed under artificial light. The olive-black shade obtained by the after-chroming process, when using this dye, also possesses these same good dyeing properties and as indicated above, does not stain acetate fiber effects.

Having now fully described our invention and having illustrated it by a specific example, clearly setting forth the best manner in which to perform it, what we claim as new is:

The chromium complex compound of the monoazo dye having the following structural formula:

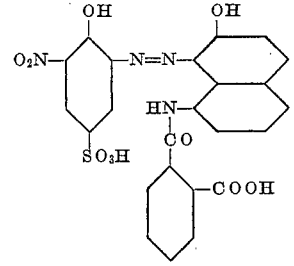

HARRY W. GRIMMEL.
LUDWIG RICHTER.

REFERENCES CITED

The following references are of record in the file of this patent:

UNITED STATES PATENTS

| Number | Name | Date |
|---|---|---|
| 1,411,245 | Geldermann et al. | Mar. 28, 1922 |
| 1,925,434 | Clingestein et al. | Sept. 5, 1933 |